United States Patent
Mazurek

(10) Patent No.: US 6,423,213 B1
(45) Date of Patent: Jul. 23, 2002

(54) CONTINUOUS LEVEL MEASUREMENT FOR GREASE SEPARATOR

(75) Inventor: Niel Mazurek, Huntingdon Valley, PA (US)

(73) Assignee: Josam Company, Philadelphia, PA (US)

( * ) Notice: Subject to any disclaimer, the term of this patent is extended or adjusted under 35 U.S.C. 154(b) by 0 days.

(21) Appl. No.: 09/627,389

(22) Filed: Jul. 28, 2000

(51) Int. Cl.$^7$ .................................................. C02F 1/40
(52) U.S. Cl. ...................... 210/115; 210/86; 210/143; 340/620; 361/284; 73/304 C
(58) Field of Search .............................. 210/86, 97, 115, 210/149, 538, 540, 143, DIG. 8; 417/32; 340/620; 73/304 R, 304 C; 137/392; 361/284

(56) References Cited

U.S. PATENT DOCUMENTS

| | | | |
|---|---|---|---|
| 4,025,846 A | * | 5/1977 | Franz et al. |
| 4,232,300 A | * | 11/1980 | Wright et al. |
| 5,705,055 A |   | 1/1998 | Holloway, Jr. et al. |
| 5,935,449 A |   | 8/1999 | Buehler et al. |
| 5,973,415 A | * | 10/1999 | Brenner et al. |
| 6,318,172 B1 | * | 11/2001 | Byatt et al. ................. 361/284 |

* cited by examiner

Primary Examiner—Joseph W. Drodge
Assistant Examiner—Terry K. Cecil
(74) Attorney, Agent, or Firm—Tarolli, Sundheim, Covell, Tummino & Szabo L.L.P.

(57) ABSTRACT

An automatic draw-off grease interceptor 10 includes a separation tank 12 defining a chamber 40. An inlet 24 delivers an effluent stream of grease and water into the chamber which separates into a thicken layer of grease atop a water layer. A pump 70 is included for pumping grease from the chamber when the grease has reached a predetermined level 120. A conductive probe 90 extends vertically in the separation tank 12 from a location above the upper surface of the effluent to a location below the predetermined level 120. An R/C oscillator circuit 112 continuously measures the amount of water in the chamber by measuring the capacitance between the probe and a wall of the tank. A controller 116 actuates the pump in response to the R/C oscillator circuit measuring a capacitance corresponding to an amount of water in the tank when the grease layer reaches the predetermined level.

5 Claims, 3 Drawing Sheets

CONTINUOUS LEVEL MEASUREMENT FOR GREASE SEPARATOR

BACKGROUND OF THE INVENTION

The present invention relates to an apparatus for automatically recovering grease from a grease separator. In particular, the present invention relates to a sensor operative for sensing the presence of a thickened layer of grease in the body of effluent.

It is known to pass the effluent from food processing facilities or other operations through devices for removing grease, to enable the grease to be kept out of a sewage system. Some such devices use a sensor for sensing the presence of a thickened layer of grease in the body of effluent in the device. The output of the sensor is then used to control pumping of grease from the device. An example of such a device is the interceptor shown in U.S. Pat. No. 5,705,055, which shows a capacitance level switch located at a specific height in the device. The level switch provides an SPST switch closure to an electric controller to indicate the presence of a certain level of grease and the need to commence pumping of grease.

SUMMARY OF THE INVENTION

The present invention is an automatic draw-off grease interceptor for removing grease from an effluent stream containing grease and water. The interceptor comprises a separation tank defining a separation chamber. An effluent inlet is connected with the separation tank for permitting flow of the effluent stream into the separation chamber to form a body of effluent in the separation chamber. The body of effluent has an upper surface. The interceptor includes a pump for pumping grease from the body of effluent in the separation chamber. The interceptor also comprises a sensor operative for sensing the presence of a thickened layer of grease in the body of effluent at a predetermined level. The sensor comprises an insulated conductive probe extending generally vertically in the separation tank from a location above the upper surface of the body of effluent to a location below the predetermined level. The interceptor also comprises means for continuously measuring the capacitance between the probe and the separation tank as the thickness of the layer of grease varies.

BRIEF DESCRIPTION OF THE DRAWINGS

The foregoing and other features of the present invention will become apparent to one skilled in the art to which the present invention relates upon consideration of the following description of the invention with reference to the accompanying drawings, wherein.

DESCRIPTION OF AN EMBODIMENT

The present invention relates to a method and apparatus for separating grease from effluent containing grease and water. As representative of the present invention, FIGS. 1–4 illustrate an interceptor 10. The interceptor 10 includes a separation tank 12 and a trap leg 14. An equipment cabinet 16 is connected to the separation tank 12.

Figure 2:
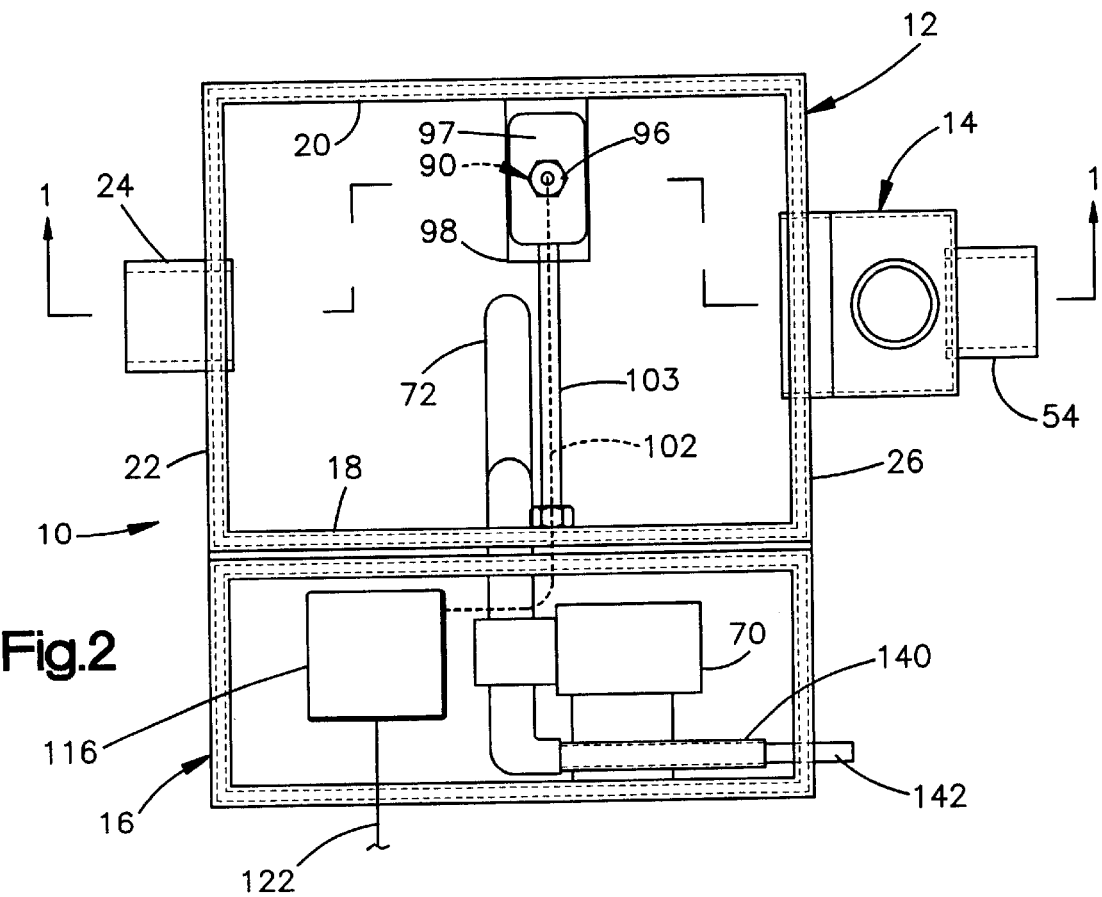
FIG. 2 is a top plan view of the interceptor of FIG. 1, taken generally along line 2—2 of FIG. 1.
Figure 3:
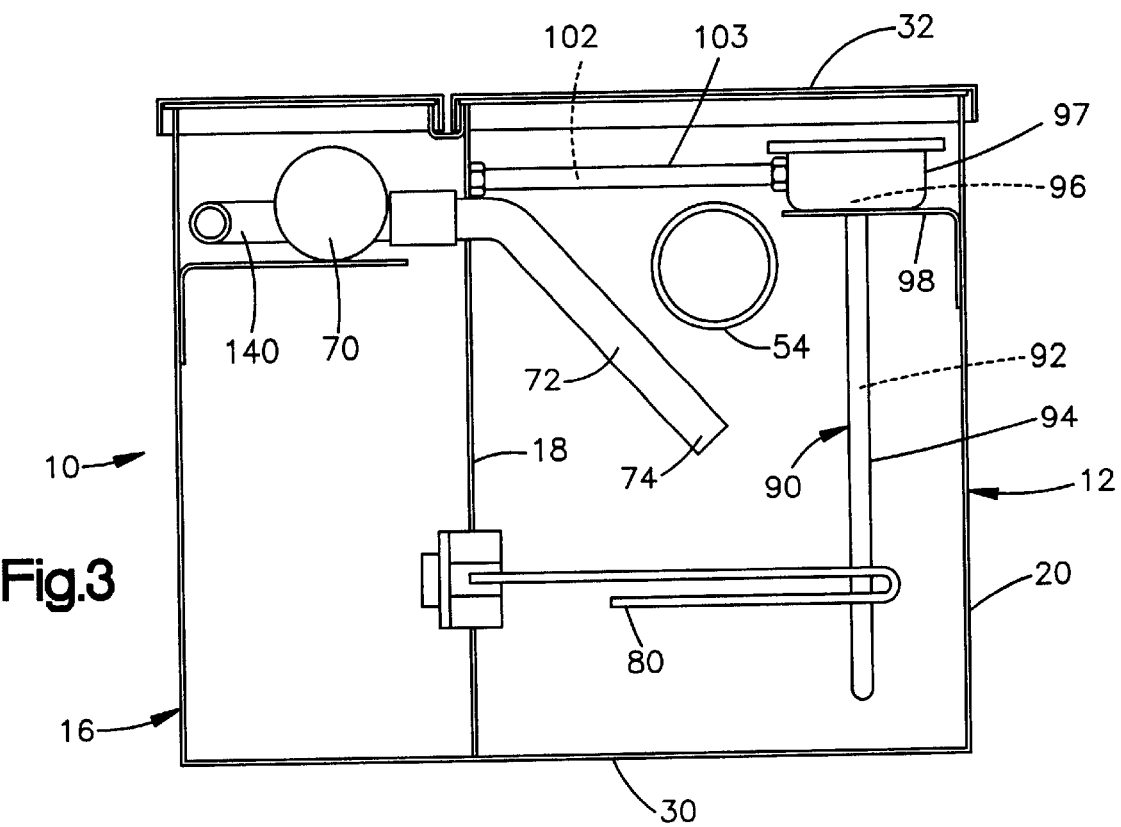
FIG. 3 is an end view of the interceptor, taken generally along line 3—3 of FIG. 1.
Figure 4:
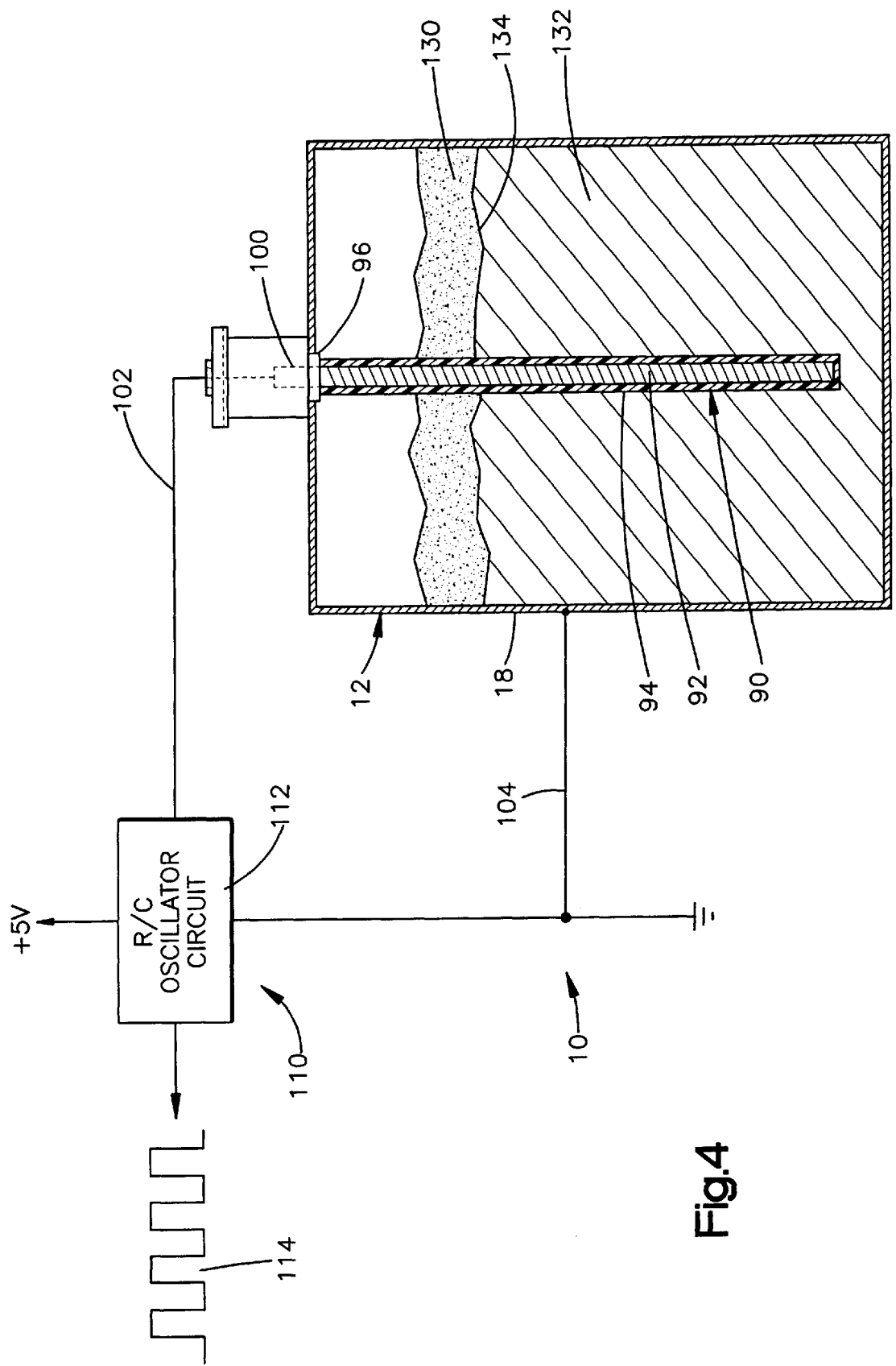
FIG. 4 is a schematic side view of the interceptor and also showing electrical components for helping to control operation of the interceptor.

The separation tank 12 is made from an electrically conductive material, such as metal, and includes a front wall 18 (FIG. 2) and an opposite back wall 20. An inlet wall 22 interconnects the front and back walls 18 and 20. An inlet 24 extends through the inlet wall 22. At its opposite end the separation tank 12 includes an end wall 26 (FIG. 2). The end wall 26 has a rectangular opening 28 into the trap leg 14.

The separation tank 12 also has a bottom wall 30 and a removable cover 32. Together, the walls 18, 20, 22, 26 and 30, and the cover 32, define a separation chamber 40 in the separation tank 12.

The trap leg 14 is a vertically extending rectangular tube, which is spaced from the separation tank 12. An open tubular open space 44 extends between the separation tank 12 and the trap leg 14 at other locations. The opening 28 in the separation tank wall 26 is aligned with an opening 46 in the tubular portion 42 of the trap leg 14, and together they define an intermediate passage 48 between the separation tank 12 and the trap leg 14. The intermediate passage 48 is disposed below the inlet 24.

An outlet wall 50 of the trap leg 14 is spaced from and extends generally parallel to the wall 26. The walls of the trap leg 14 define a water chamber 52 in the trap leg. An outlet 54 extends from the water chamber 52 in the trap leg 14 and has a lower edge 56. The lower edge 56 defines a static fluid level 60 which is the same in both the separation tank 12 and the trap leg 14. Water flowing out of the interceptor 10 from the outlet 54 is drained through suitable piping or other means (not shown) into a drain or sewer system.

The separation tank 12 includes an inlet baffle 62 and two lower baffles 64 and 66. Effluent flows upward through the spaces between the parallel baffles 62–66. A smaller amount of the effluent flows beneath the lower end of the baffle 66. The baffles 62–66 cooperate to produce an upward flow of effluent in the separation tank 12 in a direction away from the intermediate passage 48.

The upward flow of effluent induces separation by specific gravity of the components of the effluent entering the separation tank 12 with the less dense components, such as grease, floating on top of the denser components, such as water.

The equipment cabinet 16 is connected with the front wall 18 of the separation tank 12 in a manner so as to provide a dry environment for the equipment therein. Depending on installation requirements, an optional removable top cover may be provided for top access to the equipment cabinet 16. An electrically actuated pump 70 is disposed in the equipment cabinet 16. A suction conduit 72 extends from the pump 70 through the separation tank front wall 18 into the separation tank 12. The suction conduit 72 has an inlet end portion 74 disposed above the upper edge of the intermediate passage 48.

A heater 80 extends from the separation tank front wall 18 into the separation tank 12. The heater 80 is disposed below the inlet end 74 of the pump suction conduit 72 and is preferably an electrical resistance heater. The heater 80 is selectively supplied with electric current to energize the heater to heat the effluent within which the heaters are disposed. The heater 80 is operable to heat the effluent to a temperature greater than the temperature at which the grease in the effluent solidifies. It should be understood that heaters of a type other than electrical resistance heaters may be used.

In the separation tank 12, the grease separates from the water in the effluent. Since the grease is lighter than the water, the grease floats on the water. This results in the liquid in the separation tank 12 constituting a layer of grease 130 floating on a body of water 132. The thickness of the layer of grease 130, that is, the depth of the grease, is measured downward from the upper surface of the effluent in the separation tank 12 (the static level 60) to a boundary 134 between the body of grease in the upper portion of the separation tank and the body of water in a lower portion of the separation tank.

The interceptor 10 includes a grease depth signal probe 90 for measuring the thickness of the layer of grease 130. The probe 90 includes a first or inner portion 92 and a second or outer portion 94. The inner portion 92 of the probe 90 is an electrically conductive member. In the illustrated embodiment, the inner portion 92 of the probe 90 is a stainless steel rod.

The outer portion 94 of the probe 90 is an electrically non-conductive, or insulating, member. In the illustrated embodiment, the outer portion 94 of the probe 90 is a plastic sleeve on the rod 92. The plastic sleeve 94 may be made from, for example, Teflon brand plastic.

The probe 90 is an insulated conductive probe extending generally vertically in the separation tank 12 from a location above the upper surface of the effluent in the tank to a location near the bottom of the tank. The probe 90 is supported, via a coupling 96 in a water-proof container 97, and by a bracket 98, on the back wall 20 of the separation tank 12. The probe 90 extends downward in the separation tank 12. The probe 90 is spaced apart by a substantial distance from all the side walls of the separation tank 12.

An upper or outer end portion 100 of the rod 92 extends through the coupling 96. The upper end portion 100 of the rod 92 is electrically connected, via lead wires shown schematically at 102 extending through a conduit 103, with electric circuitry indicated schematically at 110. In addition, the tank wall 18, which is made from metal, is also electrically connected, via lead wires shown schematically at 104, with the electric circuitry 110.

The electric circuitry 110 measures the capacitance between the probe 90 and the tank wall 18, through any body of water between them. The capacitance between the probe 90 and the tank wall 18 is a function of the water level (amount of water) in the separation tank 12. The portion of the probe 90 covered by grease, or in air, contributes very little to the measured capacitance value.

The electric circuitry 110 includes an electronic oscillator circuit 112. The electronic oscillator circuit 112 in the illustrated embodiment includes a Resistor/Capacitor (R/C) oscillator integrated circuit device. The lead wires 102 and 104, from the probe 90 and the tank wall 18, respectively, are connected with the R/C circuit 112. The output of the circuit 112 is a square wave 114 whose frequency is proportional to the product of the RC values.

The electric circuitry 110 also includes a controller 116. The controller 116 preferably includes one or more microprocessors for controlling operation of the interceptor 10 and, specifically, the pump 70. The controller 116 may, for example, be a plurality of discrete components and/or a combination of discrete components and integrated circuits. In one example, the controller 116 is a microcomputer which receives sensory input from one or more sources, such as the probe 90, and, using the sensory input, makes determinations for control of the pump 70.

The controller 116 also contains a frequency counter function. The microprocessor in the controller is programmed to determine the frequency of the square wave signal 114 received from the oscillator circuit 112.

The electric circuitry 110 is calibrated as follows. Two level marks (not sown), typically about four inches apart, are scribed on the separation tank at known heights. The tank 12 is filled with water to the lower scribe mark. The calibration routine programmed into the controller 116 records the frequency of the oscillator circuit 112 at that water level. The separation tank 12 is also filled with water to the upper scribe mark. The calibration routine programmed into the controller 116 records the frequency of the oscillator circuit at that water level 112.

The calibration points are stored in non-volatile memory in the controller 116. The software in the microprocessor uses these two calibration points to develop an equation of frequency versus water level. This equation is valid for substantially all points along the length of the probe 90. Thus, the circuitry 110 is capable of continuously measuring the capacitance between the probe 90 and. the tank wall 18, and of providing a continuous level reading in return.

Figure 1:
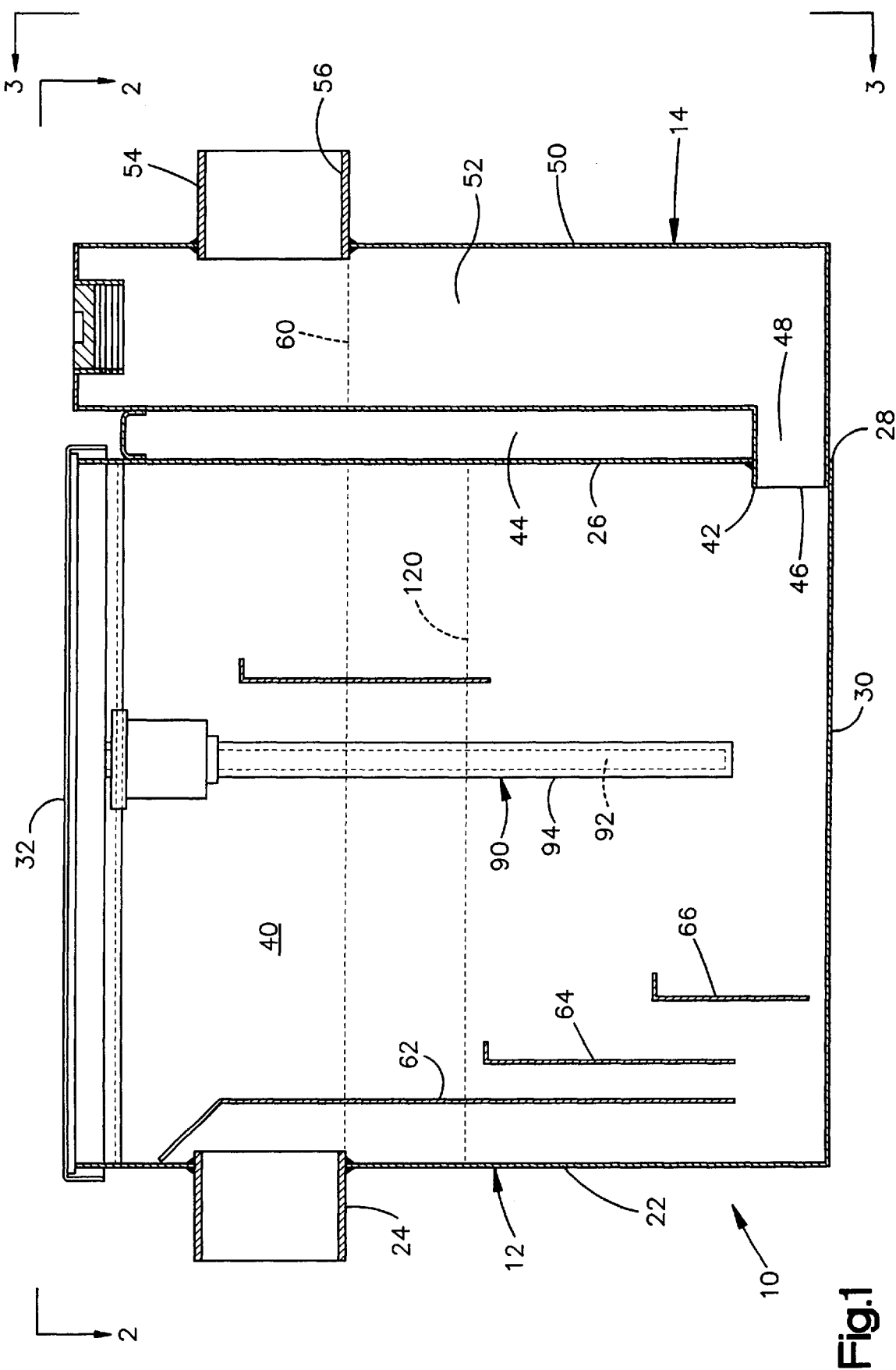
FIG. 1 is a side elevational view of an automatic draw-off grease interceptor constructed in accordance with the present invention.

The interceptor 10 is programmed to start the pumping cycle of the pump 70 when a predetermined grease layer depth, indicated in FIG. 1 by the line 120, is reached. The probe 90 extends well below the predetermined depth 120.

The controller 110 is electrically connected also with the heater 80 and 122. The controller 116 controls the operation of the heater 80 and the pump 70 in response to signals received from sensors including the grease depth signal probe 90. The controller 116 and the other electrically operated components of the interceptor 10 are supplied with electric current through an electrical wiring harness 122.

To prevent outflow of grease during initial setup of the interceptor 10, the interceptor 10 is initially filled with clean water, that is, water not having any significant grease content. Clean water is supplied through the inlet 22. As more water enters through the inlet 22, the separation tank 12 fills with water. As the separation tank 12 fills, water also flows from the separation tank through the intermediate passage 48 into the trap leg 14. The upper surface of the body of water in the trap leg 14 is at the same level as the upper surface of the body of water in the separation tank 12. The two bodies of liquid, which are interconnected through the intermediate passage 48, form one continuous body of liquid.

As more water enters through the inlet 22, the level of water in the separation tank 12 continues to rise. As the water level rises, the grease depth level probe 90 is at least partially submerged. The upper surface of the water in the separation tank 12 rises until it reaches the lower edge 56 of the interceptor outlet 54 in the trap leg 14. The water begins to flow out of the interceptor 10. The interceptor 10 is, at this point, filled with clean water, in both the separation tank 12 and the trap leg 14. The two bodies of liquid have the same level, which is the static level 60.

The effluent which is to be cleaned is then allowed to flow into the interceptor 10 through the inlet 22. The effluent flowing into the separation tank 12 mixes with the water already in the separation tank 12. The grease component of the effluent in the separation tank 12 floats to the top of the body of liquid in the separation tank. This forms what is initially a thin layer of grease 130 on top of a relatively thick layer of water 132. The grease 130 forms at least a portion of the upper surface of the effluent in the separation tank 12. The boundary 134 between this layer of grease 130 and the layer of water 132 is disposed above the upper edge of the intermediate passage 48. Thus, the grease remains in the separation tank 12 and does not flow into the trap leg 14.

As the effluent flows into the separation tank 12 through the inlet 22, the total volume of liquid in the separation tank increases. This tends to raise the level of the upper surface of the bodies of liquid in the separation tank 12 and in the trap leg 14 to a level above the static level 60. This causes a volume of liquid to flow out of the trap leg 14 through the interceptor outlet 54. The liquid which flows out of the trap leg 14 through the interceptor outlet 54 is clean water, because no grease has entered the trap leg. Simultaneously, an identical volume of liquid flows from the separation tank 12 through the intermediate passage 48 and into the trap leg 14. The liquid which flows from the separation tank 12 through the intermediate passage 48 and into the trap leg 14 is also clean water, because the boundary 134 between the grease layer 130 and the water layer 132 is above the intermediate passage.

As more effluent flows into the separation tank 12, the thickness of the grease layer 130 in the separation tank 12 increases. That is, the depth of the grease layer 130 as measured downward from the upper surface 60 of the body of fluid in the separation tank 12 increases. The boundary 134 between the layer of grease 130 and the layer of water 132 moves downward, away from the static level 60 in a direction toward the predetermined grease depth.

The grease and water separation process is preferably a continuous process, rather than a batch process. Thus, while the inlet 22 is open to enable flow of effluent into the separation tank 12, grease 130 and water 132 in the effluent separate within the separation tank 12; water flows from the separation tank into the trap leg 14; and water flows out of the trap leg and thus out of the interceptor 10 from the outlet 54. While the inlet 22 and the outlet 54 have the same surface area, the intermediate passage 48 is larger in surface area to allow this continuous flow.

As more grease collects in the separation tank 12, the depth of the layer of grease 130 increases. Simultaneously, the amount of water 132 in the separation tank 12 decreases. Thus, the boundary 134 between the grease layer 130 and the water layer 132 in the separation tank 12 moves downward toward the predetermined grease depth level 120.

As the amount of water 132 in the separation tank 12 decreases, the capacitance between the probe 90 and the tank wall 18 decreases continuously. This decrease in capacitance is sensed by the circuitry 110 and noted in the controller 116. The controller 116 compares the sensed capacitance with the values stored in its memory, and on the basis of that comparison, determines whether the amount of grease in the separation tank 12 is sufficient to start the pumping cycle of the interceptor 10.

When the controller 116 senses, by this capacitance measurement, that predetermined grease depth level 120 is reached, the controller actuates an electric alarm. The alarm signals the operator to stop the flow of effluent into the interceptor 10. After a predetermined period of time, the heater 80 is actuated to heat the body of liquid in the separation tank 12. The heater 80 heats the water layer 132 of the body of liquid in the separation tank 12.

As the water 132 is heated, so also the layer of grease 130 on top of the water is heated, and the grease is liquefied so that it can be pumped out by the pump 70. When a temperature sensor senses that the temperature of the layer of grease 130 is such that the grease is liquefied, i.e., at about 140° F., the temperature sensor signals the controller 116 to turn off the heater 80. Another alarm is also sounded, to indicate the beginning of the pumping process.

The pump 70 is then turned on in response to a signal from the controller 116. Grease is pumped out of the separation tank 12 of the interceptor 10. The grease is suctioned into the pump inlet 74 and through the suction conduit 72 to the pump 70. The grease is then pumped through a conduit 140 and a pump outlet 142, and exits the interceptor 10. The grease is then stored or transported elsewhere in an appropriate manner.

During the time period when grease is being pumped out of the separation tank 12, the upper surface of the body of liquid in the separation tank 12 falls. This is because no effluent is entering the separation tank 12. The upper surface of the body of water in the trap leg 14 also drops as water therefrom flows back into the separation tank 12.

The pump 70 remains actuated for a predetermined period of time. This predetermined period of time is selected to be long enough to pump all or substantially all of the grease layer 130 out of the separation tank 12. When the predetermined period of time expires, the controller 116 turns off the pump 70 to interrupt pumping of grease from the interceptor 10.

The controller 116 also actuates a suitable visual or audible signal so that the operator can resume the flow of effluent through the inlet 22. The level of effluent in the separation tank 12 and the trap leg 16 again rises. As the level of liquid in the separation tank 12 increases, the grease depth level probe 90 is submerged with clear water. When sufficient clear water is surrounding the probe 90, the capacitance between the probe and the tank wall 18 increases to a point at which the controller 116 resets its operative cycle.

The interceptor 10 may also be operated by allowing some effluent to continue to flow into the separation tank 12 through the inlet 22 while grease is being heated by the heater 80 and then pumped out by the pump 70. In this case, because effluent continues to flow into the separation tank 12 while grease is being heated, the heating portion of the cycle takes longer than if the inlet flow is stopped during the cycle.

The grease depth level probe 90 acts as a continuous level sensor—that is, it provides continuously a signal indicative of the capacitance between the probe 90 and the tank wall 18. As the water/grease level in the separation tank 12 varies, the capacitance varies. The water level is indicative of the thickness of the grease layer 130. So, the circuitry 110 provides a continuous reading of the thickness of the layer of grease 130.

Over an extended period of time, grease may tend to coagulate on the internal parts of the interceptor 10. If the interceptor 10 were to sense grease depth only at a single vertical point in the separation tank 12 (by sensing the presence or absence of water at that one level), then a buildup of grease at the single-point sensor could cause erratic or incorrect readings and operation of the interceptor. For example, such a sensor might always indicate the presence of grease, not water. Alternatively, grease buildup might trap a small amount of water so that the sensor might always indicate the presence of water, not grease.

With the interceptor 10 of the present invention, however, coagulated grease around one portion of the probe 90 has minimal effect on the measured water level, because the probe is sensing the presence or absence of water along its entire length. In addition, changes over time, resulting from buildup of grease or scum on the probe 90, can be compensated for by software at the controller 116 without need for recalibration at the tank level.

From the above description of the invention, those skilled in the art will perceive improvements, changes and modification in the invention. Such improvements, changes and modifications within the skill of the art are intended to be covered by the appended claims.

I claim:

1. An automatic draw-off grease interceptor for removing grease from an effluent stream containing grease and water, comprising:

a grease/water separation tank defining a separation chamber;

an effluent inlet connected with said separation tank for permitting flow of the effluent stream into said separation chamber to form a body of effluent in said separation chamber, the body of effluent having an upper surface;

a pump adapted to pump grease from the body of effluent in said separation chamber upon a thickened layer of grease in said tank reaching a predetermined level;

a grease depth level sensor comprising an elongated conductive probe extending generally vertically in said separation tank from a location above the upper surface of the body of effluent to a location below said predetermined level;

a measuring means adapted to continuously measure the amount of water in the body of effluent by measuring the capacitance between the probe and a wall of the separation tank as the thickness of a layer of grease in the tank varies; and control means adapted to actuate the pump in response to said measuring means measuring a capacitance corresponding to an amount of water in said tank when said thickened layer of grease reaches said predetermined level.

2. An interceptor as set forth in claim 1 wherein said conductive probe comprises a metal member within an electrically insulating sleeve, said metal member being electrically connected with said measuring means.

3. An interceptor as set forth in claim 2 wherein said measuring means comprises an R/C oscillator circuit and said control means is responsive to said oscillator circuit to control said pump.

4. An interceptor as set forth in claim 1 wherein said control means comprises a controller having a non-volatile memory and an equation of frequency versus water level that is valid for substantially all points along the length of said probe, and said controller is operative to compare the sensed capacitance with values stored in its memory, and on the basis of said comparison, determine whether the amount of grease in said separation tank is sufficient to actuate said pump.

5. An interceptor as set forth in claim 4 wherein said controller comprises means to account for buildup of materials on said sensor during the lifetime of said interceptor.

* * * * *